United States Patent
Gulwani et al.

(10) Patent No.: US 9,002,758 B2
(45) Date of Patent: Apr. 7, 2015

(54) RANKING FOR INDUCTIVE SYNTHESIS OF STRING TRANSFORMATIONS

(71) Applicant: Microsoft Corporation, Redmond, WA (US)

(72) Inventors: Sumit Gulwani, Redmond, WA (US); Rishabh Singh, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 13/653,581

(22) Filed: Oct. 17, 2012

(65) Prior Publication Data

US 2014/0108305 A1   Apr. 17, 2014

(51) Int. Cl.
G06F 15/18 (2006.01)
G06F 17/22 (2006.01)

(52) U.S. Cl.
CPC ................... *G06F 17/2264* (2013.01)

(58) Field of Classification Search
None
See application file for complete search history.

(56) References Cited

U.S. PATENT DOCUMENTS

| | | | |
|---|---|---|---|
| 7,801,839 B2 | 9/2010 | Kates et al. | |
| 8,060,880 B2 * | 11/2011 | Cherem et al. | 718/102 |
| 8,181,163 B2 * | 5/2012 | Jojic et al. | 717/135 |
| 8,249,336 B2 * | 8/2012 | Arasu et al. | 382/159 |
| 8,266,598 B2 * | 9/2012 | Gulwani et al. | 717/130 |
| 8,271,404 B2 * | 9/2012 | Gulwani et al. | 706/12 |
| 8,316,345 B2 * | 11/2012 | Gulwani et al. | 717/104 |
| 8,397,221 B2 * | 3/2013 | Gulwani et al. | 717/143 |
| 8,402,439 B2 * | 3/2013 | Gulwani et al. | 717/126 |
| 8,484,550 B2 * | 7/2013 | Gulwani et al. | 715/217 |
| 8,650,207 B2 * | 2/2014 | Gulwani et al. | 707/769 |
| 8,719,801 B2 * | 5/2014 | Gulwani et al. | 717/132 |
| 8,752,029 B2 * | 6/2014 | Gulwani et al. | 717/131 |
| 8,799,234 B2 * | 8/2014 | Gulwani et al. | 707/687 |
| 8,825,572 B2 * | 9/2014 | Nori et al. | 706/13 |
| 2008/0282108 A1 | 11/2008 | Jojic et al. | |
| 2010/0223213 A1 | 9/2010 | Su et al. | |
| 2011/0038531 A1 * | 2/2011 | Arasu et al. | 382/155 |
| 2011/0302553 A1 | 12/2011 | Gulwani | |
| 2012/0011084 A1 | 1/2012 | Gulwani et al. | |
| 2012/0011152 A1 | 1/2012 | Gulwani et al. | |
| 2014/0108305 A1 * | 4/2014 | Gulwani et al. | 706/12 |

OTHER PUBLICATIONS

Multiword Expression Recognition Using Multiple Sequence Alignment, Ru Li ; Lijun Zhong ; Jianyong Duan Advanced Language Processing and Web Information Technology, 2008. ALPIT '08. International Conference on DOI: 10.1109/ALPIT.2008.71 Publication Year: 2008 , pp. 133-138.*

(Continued)

*Primary Examiner* — Michael B Holmes
(74) *Attorney, Agent, or Firm* — Steve Wight; Judy Yee; Micky Minhas

(57) ABSTRACT

Ranking technique embodiments are presented that use statistical and machine learning techniques to learn the desired ranking function for use in inductive program synthesis for the domain of string transformations. This generally involves automatically creating a training dataset of positive and negative examples from a given set of training tasks, each including multiple input-output examples. From the training dataset, a ranking function is learned that assigns an expression in a program in the domain specific language to a likelihood measure. This ranking function is then used to compute likelihoods of learnt programs from a very small number of input-output examples for a new task.

20 Claims, 5 Drawing Sheets

(56) References Cited

OTHER PUBLICATIONS

Symbolic parallelization of loop programs for massively parallel processor arrays, Teich, J. ; Tanase, A. ; Hannig, F. Application-Specific Systems, Architectures and Processors (ASAP), 2013 IEEE 24th International Conference on DOI: 10.1109/ASAP.2013.6567543 Publication Year: 2013 , pp. 1-9.*

Joint Alignment and Clustering via Low-Rank Representation, Qi Li ; Zhenan Sun ; Ran He ; Tieniu Tan Pattern Recognition (ACPR), 2013 2nd IAPR Asian Conference on DOI: 10.1109/ACPR.2013.66 Publication Year: 2013 , pp. 591-595.*

Temporal Analysis for Adapting Concurrent Applications to Embedded Systems, Mohan, S. ; Helander, J. Real-Time Systems, 2008. ECRTS '08. Euromicro Conference on DOI: 10.1109/ECRTS.2008.38 Publication Year: 2008 , pp. 71-82.*

Fan, W., M. D. Gordon, P. Pathak, A generic ranking function discovery framework by genetic programming for information retrieval, Info. Process. Manage., 2003, Received Jan. 21, 2003, Accepted Aug. 8, 2003, <<citeseerx.ist.psu.edu/viewdoc/download?doi=10.1.1.95.4456&rep=rep1&type=pdf>>, pp. 1-16.

Gulwani, S., Dimensions in program synthesis, Proc. of the 12th Int'l ACM SIGPLAN Conf. on Principles and Practice of Declarative Programming, PPDP 2010, Jul. 26-28, 2010, pp. 13-24, Hagenberg, Austria.

Lau, T. A., P. Domingos, D. S. Weld, Learning programs from traces using version space algebra, Proc. of the 2nd Int'l Conf. on Knowledge Capture, K-CAP 2003, Oct. 23-25, 2003, pp. 36-43, Sanibel Island, FL, USA.

Schrödl, S., S. Edelkamp, Inferring flow of control in program synthesis by example, KI-99: Advances in Artificial Intelligence, Proc. of the 23rd Annual German Conf. on Artificial Intelligence, KI 1999, Sep. 13-15, 1999, pp. 171-182, Bonn, Germany, Springer.

Srivastava, S., S. Gulwani, J. S. Foster, From program verification to program synthesis, Proceedings of the 37th ACM SIGPLAN-SIGACT Symposium on Principles of Programming Languages, POPL 2010, Jan. 17-23, 2010, pp. 313-326, Madrid, Spain.

"International Search Report & Written Opinion for PCT Patent Application No. PCT/US2013/065497", Mailed Date: Sep. 26, 2014, 9 Pages.

Gulwani, Sumit, "Automating String Processing in Spreadsheets Using Input-Output Examples", In Proceedings of 38th Annual Symposium on Principles of Programming Languages, Jan. 26, 2011, pp. 317-329.

Gulwani, et al., "Spreadsheet Data Manipulation Using Examples", In Communications of the ACM, vol. 55, Issue 8, Aug. 2012, pp. 97-105.

Lau, et al., "Programming by Demonstration Using Version Space Algebra", In Journal of Machine Learning, vol. 53, Issue 1-2, Oct. 2003, 60 Pages.

Menon, et al., "A Machine Learning Framework for Programming by Example", In Proceedings of the 30th International Conference on Machine Learning, Jun. 2013, 9 Pages.

Singh, et al., "Learning Semantic String Transformations from Examples", In Very Large Data Base Endowment, vol. 5, Issue 8, Apr. 1, 2012, pp. 740-751.

"Predicting a Correct Program in Programming by Example", Published on: Jul. 8, 2014, Available at: http://people.csail.mit.edu/rishabh/papers/working/ranking.pdf.

Singh, et al., "Synthesizing Number Transformations from Input-Output Examples", In Proceedings of the 24th International Conference on Computer Aided Verification, Jul. 7, 2012, 18 Pages.

* cited by examiner

|   | Input $v_1$ | Output |
|---|---|---|
| 1 | Roger | Mr. Roger |
| 2 | Simon | |
| 3 | Benjamin | |
| 4 | John | |

FIG. 7

|   | Input $v_1$ | Output |
|---|---|---|
| 1 | 243 Flyer Drive, Cambridge, MA 02145 | Cambridge |
| 2 | 512 Wright Ave, Los Angeles, CA 78911 | |
| 3 | 64 128th St, Seattle, WA 98102 | |
| 4 | 560 Hearst Ave, San Francisco, CA 94129 | |

FIG. 8

RANKING FOR INDUCTIVE SYNTHESIS OF STRING TRANSFORMATIONS

BACKGROUND

Millions of people worldwide use spreadsheets, and the like, for storing and manipulating data. These data manipulation scenarios often involve converting a large quantity of input information from one format to another format to produce a desired output. Typically, these tasks are accomplished manually or with the use of small, often one-off, computer programs that are either created by the end-user or by a programmer for the end-user.

Another approach has involved attempts to employ a computer to synthesize a program to accomplish the desired data transformation. There are two major approaches of synthesizing programs: deductive and inductive. In deductive program synthesis, a complete high-level specification is translated into the corresponding low-level program where each step of translation is validated using some axioms. This approach requires users to provide a complete specification, which in some cases may potentially be harder than writing the program itself. This has caused the inductive synthesis approaches to become more popular recently. In the inductive program synthesis approach, a program is synthesized from an incomplete specification such as a specification consisting of a set of input-output examples. It has been used recently for synthesizing programs from various domains ranging from low-level pointer manipulating code to spreadsheet macros.

Since the specification in inductive program synthesis approaches is incomplete and often ambiguous, there exists many different programs in the underlying domain-specific language that are consistent with the given specification. To remove ambiguity and converge to the desired program, the user needs to strengthen the specification by providing additional input-output examples. The number of examples are directly proportional to the expressivity of the domain-specific language, i.e. the more expressive the language, the more input-output examples required to converge to the desired program.

The domain-specific language needs to be expressive to express most tasks that users desire, but at the same time the users cannot be expected to provide an onerous number of input-output examples to learn the desired program.

SUMMARY

Ranking technique embodiments described herein generally involve ranking candidate transformation programs generated through an inductive program synthesis procedure using just a small number of user-supplied input-output examples. In one embodiment, a computer is used for ranking candidate transformation programs to establish a ranked group of one or more transformation programs each of which produces an output string in a user-desired form from each input string entered by a user, consistent with each of one or more user-supplied input-output examples.

More particularly, the set of candidate transformation programs is input. It is noted that each transformation program is made up of program expressions in a domain-specific language, which are in turn made up of sub-expressions. Ranking schemes are established from offline training data for sub-expressions found in the candidate transformation programs. Each of these ranking schemes produces a likelihood score indicative of the likelihood that the sub-expression is part of a program capable of producing an output string in the user-desired form from each input string entered by a user, which is consistent with each of the user-supplied input-output examples. For each sub-expression of each candidate transformation program for which a ranking scheme has been established, a likelihood score is established using the ranking scheme established for that sub-expression. The likelihood scores are computed in the order from smaller sub-expressions to larger ones. An overall ranking score is then computed for each candidate transformation program from the sub-expression likelihood scores established for that candidate transformation program.

In one embodiment, the overall ranking associated with each of the candidate transformation programs is used to select a prescribed number of the top ranking candidate transformation programs. These top ranking programs are then designated as the aforementioned ranked group of one or more transformation programs. It is noted that in one implementation the prescribed number is one, and so only the highest-ranking candidate transformation program is selected and designated.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 7 is a table depicting a spreadsheet having an input column containing input strings representing a person's last name, and an output column having one example output string containing the corresponding input string name with the string "Mr." placed in front of it.

FIG. 8 is a table depicting a spreadsheet having an input column containing addresses including a city name, and an output column having one example output string containing a part of the corresponding input string corresponding to the city name.

DETAILED DESCRIPTION

Figure 1:
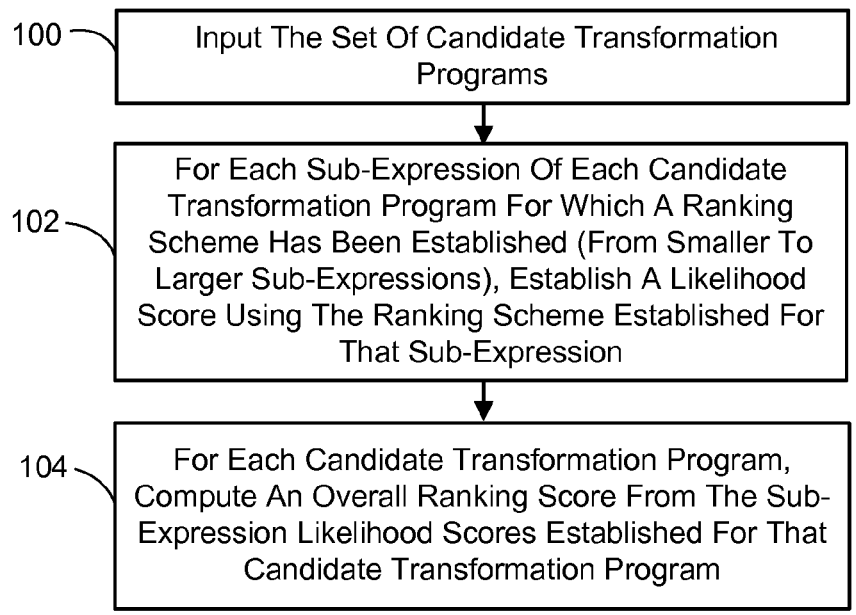
FIG. 1 is a flow diagram generally outlining one embodiment of a process for ranking candidate transformation programs.

In the following description of ranking technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

It is also noted that for the sake of clarity specific terminology will be resorted to in describing the ranking technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the ranking technique. The appearances of the phrases "in one embodiment", "in another embodiment", "in an exemplary embodiment", "in an alternate embodiment", "in one implementation", "in another implementation", "in an exemplary implementation", "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the ranking technique does not inherently indicate any particular order nor imply any limitations of the ranking technique.

It is further noted that the term "input-output example" as used herein refers to a tuple of character strings that form the input and a character string that forms the output. The input represents an example of the input that the user wishes to transform, whereas the output string represents an example of the output that the user wishes to be produced from the input.

1.0 Ranking Technique for Inductive Program Synthesis

Ranking technique embodiments described herein use statistical and machine learning techniques to learn a desired ranking function for use in inductive program synthesis. In general, a training dataset of positive and negative examples are automatically created from a given set of input-output examples. From the training dataset, ranking functions are learned that assign an expression in a program in a domain specific language to a likelihood measure. These ranking functions are then used to compute likelihoods of learnt programs from a very small number of input-output examples.

1.1 String Transformation Language $\mathcal{L}_s$

In this section, a string transformation language for implementing the ranking technique embodiments is described herein. The syntax for the string transformation language $\mathcal{L}_s$ is as follows:

Trace expr e := Concatenate($f_1, \ldots, f_n$)
Atomic expr f := SubStr($v_i, p_1, p_2$)
  | ConstStr(s)
Position expr p := CPos(k) | Pos($r_1, r_2, c$)
Integer expr c := k
Regular expr r := TokenSeq($T_1, \ldots, T_m$).

A trace (or concatenate) expression e denotes the concatenation of atomic expressions $f_1, \ldots, f_n$. An atomic expression f can either denote a constant string expression ConstStr(s) or a substring expression SubStr($v_i, p_1, p_2$). The constant string expression ConstStr(s) denotes an expression that generates the constant string "s". The substring expression SubStr($v_i, p_1, p_2$) represents a substring of the input string present in column $v_i$ whose left and right positions are represented by position pair expressions $p_1$ and $p_2$ respectively. The position expression CPos(k) refers to the $k^{th}$ index in the given string from the left side (or right side), if the integer constant is positive (or negative). The position expression Pos($h_1, r_2, c$) denotes a position in the input string whose left and right sides match the regular expressions $r_1$ and $r_2$ respectively, and it is the $c^{th}$ such match of the regular expressions in the string. Formally, the regular expression $r_1$ matches some suffix of s[0 ... t−1] and $r_2$ matches some prefix of s[0 ... l+1], where l=Length(s), and t is the $c^{th}$ such index/position starting from the left side (or the right side) if c is positive (or negative).

1.2 Ranking Sets of $\mathcal{L}_s$ Expressions

The data-structure for representing a large set of $\mathcal{L}_s$ expressions is as follows:

$\tilde{e} := \text{Dag}(\tilde{\eta}, \eta^s, \eta^t, \tilde{\xi}, W)$
$\tilde{f} := \text{SubStr}(v_i, \{p_j\}_j, \{p_k\}_k)$
  | ConstStr(s)
$p := \text{CPos}(k) | \text{Pos}(r_1, r_2, c)$
$r := \text{TokenSeq}(T_1, \ldots, T_m)$ The data structure maintains independent sub-expressions of an expression independently to represent an exponential number of expressions in polynomial space. For example, the set of substring expressions SubStr ($v_i, \{p_j\}_j, \{p_k\}_k$) maintains the set of left ($\{p_j\}_j$) and right position expressions ($\{p_k\}_k$) independently. The mapping W maps each edge in $\tilde{\xi}$ to a set of SubStr and ConstStr expressions, thereby achieving sharing even between Concatenate expressions of different lengths (Each path in the dag from the start node $\eta^s$ to target node $\eta^t$ represents a set of Concatenate expressions obtained by taking any expression from each edge in the path and concatenating them.) The ranking technique embodiments described herein maintain this independence of sub-expressions and ranks the set of sub-expressions independently. Three techniques for ranking the set of sub-expressions are used: frequency-based ranking (for ranking regular expressions r and position expressions p), feature-based ranking (for ranking Substr expressions), and path-based ranking (for ranking the Concatenate expression).

1.2.1 Frequency-Based Ranking

For regular expressions and position expressions (both of which take values from some finite sets), a frequency-based ranking is preformed to rank such expressions. There exists a dictionary $\mathcal{D}$ that maps each possible expression value to its frequency as estimated from the training data. The likelihood score of a regular expression is defined to be directly proportional to its frequency score. The likelihood score of a position expression can be defined to be any linear function of its frequency score and square-root of the likelihood scores of its constituent regular expressions.

1.2.2 Feature-Based Ranking

For expressions such as atomic expressions f that take values from an unbounded set, a feature-based ranking is performed. A set of features $\phi(e)$ are computed from the underlying input-output example and the likelihood is obtained from a machine learning procedure. For ranking the choice between a constant string expression and a substring expression for the atomic expression f, a support vector machine (SVM) binary-classification procedure is used in one embodiment.

1.2.3 Path-Based Ranking

For concatenate expressions, which are made up of atomic expressions, a path-based ranking is performed. In one embodiment, this path-based ranking involves combining scores for individual atomic expressions found in a concatenate expression. In one implementation, the likelihood scores for the atomic expressions are combined by multiplying them, and in another implementation they are added together.

1.3. Automated Training Data Generation

In this section, one embodiment of a method for automatically generating training data consisting of positive examples (or, positive and negative examples) from a set of input-output examples for frequency-based ranking (or, feature-based ranking respectively) is described. A large set of tasks, each consisting of multiple input-output examples $\{(i_1, o_1), \ldots, (i_n, o_n)\}$, is obtained. A synthesis procedure learns the set of all programs $\tilde{P}_k$ that are consistent with each input-output example $(i_k, o_k)$. The positive and negative expression values are then obtained as follows: Positive expression values are made up of expression values present in the set $\tilde{P}_1 \cap \tilde{P}_2 \ldots \cap \tilde{P}_n$; and negative expression values are made up of expression values present in the set $\{\tilde{P}_k \setminus (\tilde{P}_1 \cap \tilde{P}_2 \ldots \cap \tilde{P}_n) | 1 \leq k \leq n\}$.

1.3.1 Positive and Negative Expression Values

Given two directed acyclic graphs (dags) $\mathcal{D}_k$ and $\mathcal{D}_\cap \equiv (\mathcal{D}_1 \cap \mathcal{D}_2 \ldots \mathcal{D}_n)$, the challenge is to align the edges in the two dags to compute the positive and negative expression values. After aligning the dags, the common edges between them constitutes the positive expression values and the edges that are present in $\mathcal{D}_k$ but not in $\mathcal{D}_\cap$ constitutes the negative expression values.

The DAG programs $\mathcal{D}_k$ and $\mathcal{D}_\cap$ are run on the input string $i_k$ and the dag nodes are annotated with the indices of the output string $o_k$ using the label function $\mathcal{L}: \eta \rightarrow \text{int}$. The start node $\eta^s$ of a dag is annotated with index 0, such that $\mathcal{L}(\eta^s)=0$. A node $\eta_2$ in a dag is annotated with index m (i.e., $\mathcal{L}(\eta^2)=m$) if $\mathcal{L}(\eta_1)=l$ and the expressions on the dag edge $(\eta_1, \eta_2)$ produce the string $o_k[l \ldots m]$ when run on the input string $i_k$. Once the nodes of both dags have been annotated, the expressions on edges between nodes that have the same labels are collected for comparison. The set of expressions that generate the string $o_k[l \ldots m]$ in dag $\mathcal{D}_k$ is denoted as $\tilde{e}_{l,m,k}$, where $\tilde{e}_{l,m,k} \equiv \cup_{\eta_1, \eta_2 \in \mathcal{D}_k} \tilde{e}(\eta_1, \eta_2), \mathcal{L}(\eta_1)=l, \mathcal{L}(\eta_2)=m$. Expressions that appear in $\tilde{e}_{l,m,\cap}$ are denoted as positive expressions and expressions that appear in the set $\tilde{e}_{l,m,k} \setminus \tilde{e}_{l,m,\cap}$ are denoted as the negative expressions. The set of positive and negative expression values is obtained for each input-output example pair.

1.3.2 Frequency-Based Training Data Generation

For ranking regular expressions and position expressions, a frequency-based ranking approach is performed as both of them takes values from finite sets. A database of token sequences together with their frequency scores for token sequence expressions is also created. The frequencies are estimated from the set of positive training expressions. The frequencies can also be estimated for each different context in which a certain expression occurs. For example, a position expression can either be a left position expression or a right position expression (denoting whether that position expression occurs as the first or second argument of a SubStr expression). A regular expression also occurs in two different contexts inside a position expression.

1.3.3 Feature-Based Training Data Generation

One of the major ambiguities in learning string transformations comes from making the decision as to whether a substring in the output string is a constant string or a substring of an input string. Since making such a decision is not only dependent on the possible values for position pair and constant string expressions but also on the input and output strings, it is not possible to use frequency-based ranking in this case as there are infinitely many possible input and output strings. Instead, in one embodiment, a feature-based ranking approach is used to select between SubStr and ConstStr expressions. More particularly, a set of features is defined for each SubStr expression. Examples of features that can be used, include, but are not limited to, the following:

a) IsOutputLeftTok: a boolean value that denotes whether the left position of the output substring can be recognized by a token;

b) IsOutputLeftConstant: a boolean value that denotes whether the character at the left position of the output substring is a constant;

c) IsOutputRightTok: a boolean value that denotes whether the right position of the output substring can be recognized by a token;

d) IsOutputRightConstant: a boolean value that denotes whether the character at the right position of the output substring is a constant;

e) IsOutputTok: a boolean value that denotes whether the output substring denotes a token;

f) IsInputLeftTok: a boolean value that denotes whether the left position of the input substring can be recognized by a token;

g) IsInputRightTok: a boolean value that denotes whether the right position of the input substring can be recognized by a token;

h) IsInputTok: a boolean value that denotes whether the input substring is a token;

i) Casing: the casing performed to obtain the output substring;

j) LenSubstring: the length of the substring;

k) RelLenInSubstring: the relative length of the substring to the length of the input string (lenSubstring/lenInputString); and l) RelLenOutSubstring: the relative length of the substring to the length of the output string (lenSubstring/lenOutputString).

m) The likelihood scores of the constituent position expressions estimated using the frequency based ranking scheme.

All these features can be computed in a constant O(1) time. For each positive and negative SubStr expression, a feature vector is computed together with a class label (e.g., +1 for positive expressions and 0 for negative expressions). An off-the-shelf support-vector machine (SVM) procedure can then used to learn the binary classifier. More particularly, each feature vector created has a prescribed order of elements where each element (except one reserved for the class label) corresponds to a feature value respectively associated with one of the aforementioned features. For each of the aforementioned features in the order corresponding to the prescribed order of elements, if the feature is exhibited in the SubStr expression under consideration, then a feature value having a first binary value (e.g., 1) is assigned to the corresponding feature vector element. If the feature is not exhibited, then a feature value having a second binary value (e.g., 0) is assigned to the corresponding feature vector element. In addition, the feature vector element reserved for the aforementioned class label is assigned one binary value (e.g., 1) if the SubStr expression is a positive SubStr expression, and another binary value (e.g., 0) if the SubStr expression is a negative SubStr expression.

1.4. Ranking Programs

In this section, it will be described how programs represented by a dag are ranked.

1.4.1 Ranking Dag Edge Expressions

Each edge of a dag consists of a set of SubStr and ConstStr expressions. In one embodiment, the feature based ranking assigns a likelihood score between +1 and 0 to each SubStr expression, while the likelihood score of a ConstStr expression is taken to be 0.5.

1.4.2 Ranking Dag Paths

Each path in a dag $\mathcal{D}$ represents several programs that conforms to the given input-output example. Thelikelihood score w(e) of an edge e is defined as the highest likelihood score of any SubStr or ConstStr expression on that edge. The likelihood score of a path is defined as $w(p) = \Pi_{e \in edges(p)} w(e)$, such that it is computed by multiplying (or adding) the likelihood scores of the corresponding edge expressions on the path. The Dijkstra's shortest path procedure is then used to compute the highest ranked path in the dag, and execute it to generate the highest ranked output string. The likelihood score of a path can also be a more sophisticated function of various features such as: the product/sum of the likelihood scores of all edges, the number of edges, the min/max likelihood score of any edge. Furthermore, this function can also be learned by using machine learning techniques.

1.5 Exemplary Processes for Ranking Candidate Transformation Programs

The foregoing aspects of the ranking technique embodiments described herein can be realized, in one general implementation, by the process outlined in FIG. 1. More particularly, a computer (such as any of the computing devices described in the Exemplary Operating Environments to follow) is used for ranking candidate transformation programs to establish a ranked group of one or more transformation programs each of which produces an output string in a user-desired form from each input string entered by a user, consistent with each of one or more user-supplied input-output examples. More particularly, a set of candidate transformation programs is received as input (process action 100). Each of the candidate transformation programs was inductively synthesized using conventional methods from the one or more user-supplied input-output examples, and produces an output string in a form exhibited by each user-supplied output example from each user-supplied input example. It is noted that, as described previously, each transformation program is made up of program expressions which in turn are made up of sub-expressions. Next, for each sub-expression of each candidate transformation program for which a ranking scheme has been established (from smaller to larger sub-expressions), a likelihood score is established using the ranking scheme established for that sub-expression (process action 102). It is noted that each of the ranking schemes produces a likelihood score indicative of the likelihood that the sub-expression is part of a program capable of producing an output string in the user-desired form from each input entered by a user, which is consistent with each of the user-supplied input-output examples. An overall ranking score is then computed for each candidate transformation program from the sub-expression likelihood scores established for that candidate transformation program (process action 104).

Different kinds of ranking schemes are used for different kinds of expressions. As described previously, a sub-expression can be either a regular expression or a position expression or an atomic expression or a concatenate expression. In one embodiment, regular and position expressions employ frequency-based ranking (as this type of ranking is applicable to expressions that take values from a finite set of tokens). In addition, feature-based ranking is used for atomic expressions, and path-based ranking is used for concatenate. It is also noted that for the sake of efficiency, in one embodiment, ranking schemes are established for regular expressions first, then position expressions, then atomic expressions, and finally concatenate expressions.

Figure 2:
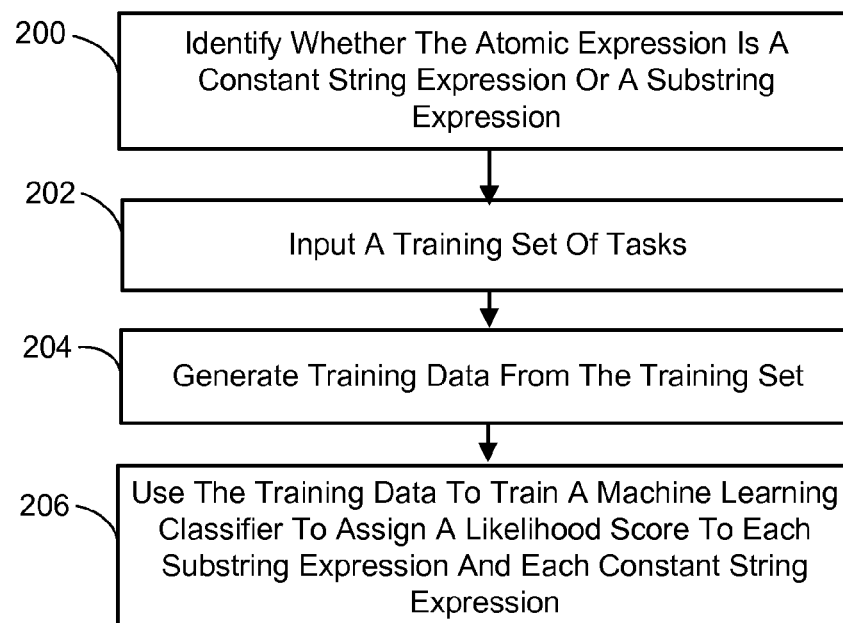
FIG. 2 is a flow diagram generally outlining an implementation of the part of the process of FIG. 1 involving establishing ranking schemes for atomic expressions.

In the case of atomic expressions, as indicated previously these can be either a constant string expression or a substring expression. Given this, referring to FIG. 2, establishing ranking schemes for atomic expressions in one embodiment first involves identifying whether the atomic expression is a constant string expression or a substring expression (process action 200). A training set of tasks is then input (process action 202). Each task set is made up of multiple input-output examples. Training data is generated from the training set (process action 204), and used to train a machine learning classifier to assign a likelihood score to each substring expression and each constant string expression (process action 206). In one embodiment, the machine learning classifier is a support vector machine (SVM) binary-classifier, and it is trained to assign a likelihood score to each substring expression having a value in a range from 0 to 1 depending on how likely it is that the sub-expression is part of the intended program. In addition, the classifier assigns a prescribed likelihood score value (e.g., 0.5) to each constant string expression.

Figure 3:
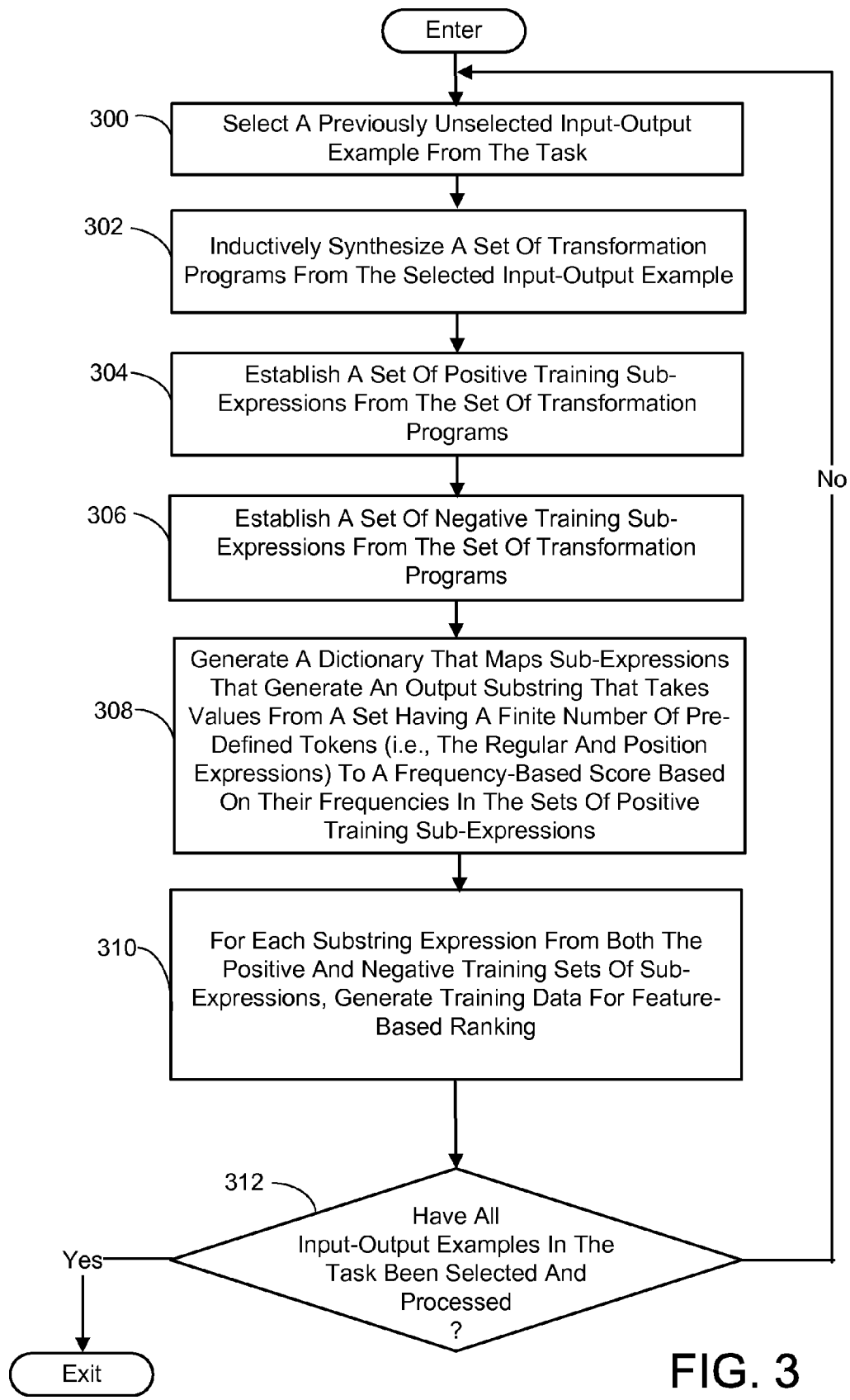
FIG. 3 is a flow diagram generally outlining an implementation of the part of the process of FIG. 2 involving generating training data from a training set of tasks.

With regard to generating training data from the training set of tasks, in one implementation this involves the following for each task in the training set. Referring to FIG. 3, a previously unselected input-output example in the task is selected (process action 300). A set of transformation programs is inductively synthesized from the selected input-output example (process action 302). Each of the transformation programs produces an output string in a form exhibited in the output of the example from a tuple of input strings in the input of the example. The tuple of input strings refers to the one or more parts of the input in an input-output example that is used to generate the output of the example. Next, a set of positive training sub-expressions is established from the set of transformation programs (process action 304), and a set of negative training sub-expressions is also established from the set of transformation programs (process action 306). In one embodiment, establishing the set of positive training sub-expressions from the set of transformation programs involves designating each sub-expression found in the intersection of all sets of transformation programs synthesized from the input-output examples in the task as a positive training sub-expression. Whereas, establishing a set of negative training sub-expressions from the set of transformation programs involves designating each sub-expression in the set of transformation programs that is not identified as positive training sub-expression as a negative training sub-expression.

At this point, ranking schemes for regular expressions and position expressions are established. More particularly, a dictionary is generated that maps sub-expressions that generate an output substring that takes values from a set having a finite number of pre-defined tokens (i.e., the regular and position expressions) to a frequency-based score based on their frequencies in the sets of positive training sub-expressions (process action 308).

Next, for each substring expression from both the positive and negative training sets of sub-expressions, training data is generated for feature-based ranking (process action 310). It is then determined if all the input-output examples in the task have been selected and processed (process action 312). If not, then process actions 300 through 312 are repeated. Otherwise the procedure ends for the selected task. The foregoing procedure is repeated for all the remaining tasks and their input-output examples.

Figure 4:
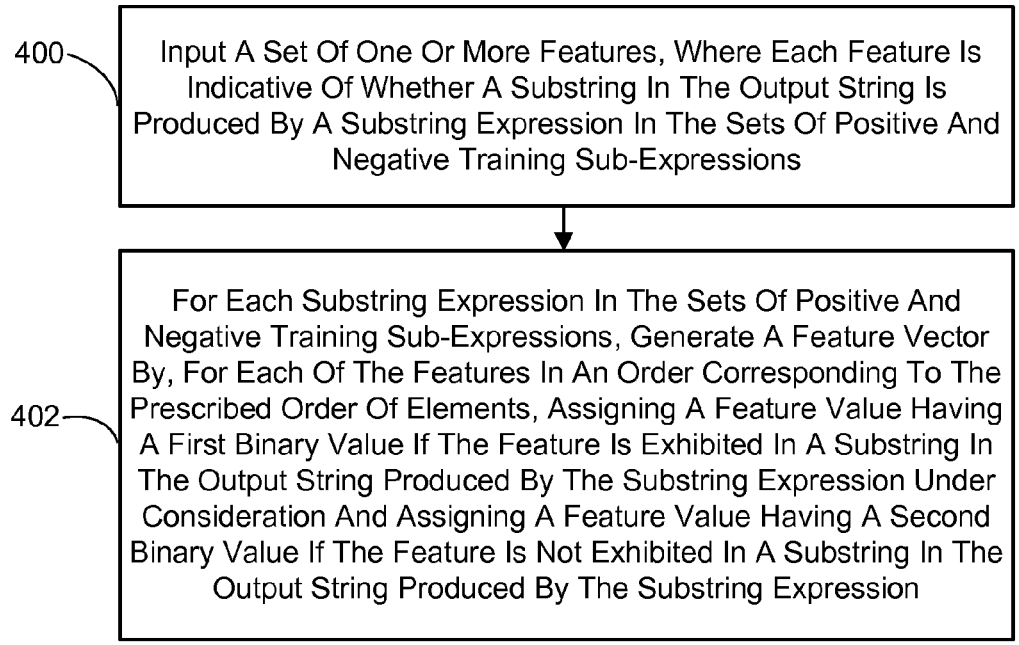
FIG. 4 is a flow diagram generally outlining an implementation of the part of the process of FIG. 3 involving generating training data from each substring expression in sets of positive and negative training sub-expressions.

With regard to the foregoing process action of generating training data from each substring expression in the sets of positive and negative training sub-expressions for feature-based ranking, this is accomplished in one embodiment as shown in FIG. 4. First, a set of one or more features (such as those described previously) is input (process action 400). Each of the features is indicative of whether a substring in the output string is produced by a one of the substring expressions in the sets of positive and negative training sub-expressions. Then, for each substring expression in the sets of positive and negative training sub-expressions, a feature vector is generated (process action 402). As described previously, each feature vector is a prescribed order of elements where each element, except one reserved for a class label, corresponds to a feature value respectively associated with one of the aforementioned features. In one embodiment, each feature vector is generated by, for each of the features in an order corresponding to the prescribed order of elements, assigning a feature value having a first binary value (e.g., 1) if the feature is exhibited in a substring in the output string produced by the substring expression under consideration. More specifically, the feature value is assigned to the feature vector element associated with the exhibited feature. In addition, a feature value having a second binary value (e.g., 0) is assigned to the feature vector element associated with the feature under consideration if that feature is not exhibited in a substring in the output string produced by the substring expression. Further, the feature vector element reserved for the aforementioned class label is assigning one binary value (e.g., 1) if the substring expression is in the set of positive training sub-expressions, and a different binary value (e.g., 0) if the substring expression is in the set of negative training sub-expressions.

With regard to establishing ranking schemes for concatenate expressions, in one embodiment, this involves combining likelihood scores for individual atomic expressions found in a concatenate expression. In one implementation this combining is accomplished by multiplying the scores, and in one implementation it is accomplished by adding the scores.

Figure 5:
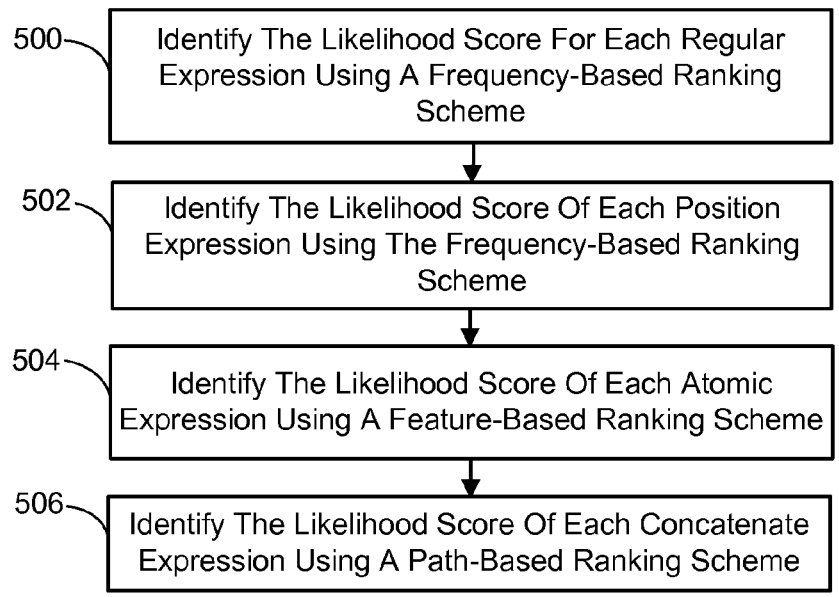
FIG. 5 is a flow diagram generally outlining an implementation of the part of the process of FIG. 1 involving establishing a likelihood score for each sub-expression of a candidate transformation program for which a ranking scheme has been established using that ranking scheme.

In view of the foregoing, in one embodiment, establishing a likelihood score for each sub-expression of a candidate transformation program for which a ranking scheme has been established using that ranking scheme involves the following. Referring to FIG. 5, first the likelihood for each regular expression is identified using a frequency-based ranking scheme (process action 500). Then, the likelihood of each position expression is identified also using a frequency-based ranking scheme (process action 502). As described previously, this frequency-based ranking can involve employing a dictionary that maps regular expressions and position expressions to a frequency-based score. Next, the likelihood of each atomic expression is identified using a feature-based ranking scheme (process action 504). As described previously, an atomic expression is either a constant string expression or a substring expression. When the atomic expression is a constant string expression, the feature-based ranking can involve assigning a prescribed likelihood score value (e.g., 0.5). And when an atomic expression is a substring expression, the feature based ranking can involve assigning a likelihood score value (e.g., ranging from 0 to 1) using a machine learning classifier that has been trained to assign a likelihood score to each substring expression. The likelihood of each concatenate expression is then identified using path-based ranking scheme (process action 506). As described previously, this path-based ranking can involve combining scores for individual atomic expressions found in a concatenate expression.

With regard to the aforementioned overall ranking established for each of the candidate transformation programs, it is possible to use these rankings in a variety of ways. For example, in one embodiment, the ranking associated with each of the candidate transformation programs is used to select a prescribed number of the top ranking candidate transformation programs, and designate these top-ranking programs as the aforementioned ranked group of one or more transformation programs. It is noted that in one implementation the prescribed number is one, and so only the highest-ranking candidate transformation program is selected and designated.

Figure 6:
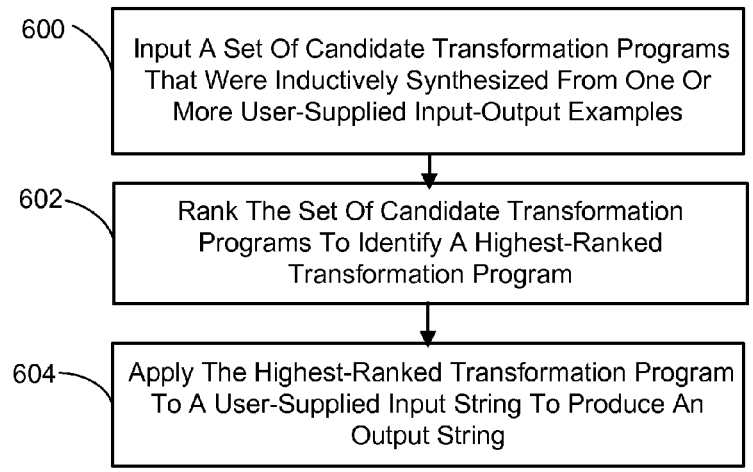
FIG. 6 is a flow diagram generally outlining one embodiment of a process for performing string transformations using the highest-ranking candidate transformation program.

1.6 Exemplary Processes for Performing String Transformations Using the Highest Ranking Transformation Program With regard to the latter embodiment involving selecting the highest-ranking candidate transformation program, this can be used in an application where a computing device performs string transformations. More particularly, referring to FIG. 6, in one general implementation, a set of candidate transformation programs that were inductively synthesized from one or more user-supplied input-output examples are input (process action 600). As described previously, each of the candidate transformation programs produces an output string in a form exhibited by each user-supplied output example from each user-supplied input example.

Once input, the set of candidate transformation programs is ranked to identify a highest-ranked transformation program (process action 602). This highest-ranked transformation program is then applied to a user-supplied input string to produce an output string (process action 604).

1.7 Example Transformation Scenarios

In this section, a couple of example transformation scenarios are presented. The ranking technique embodiments described herein can be employed to establish a transformation program capable of producing the desired output string from each input string entered based on the small number of input-output examples found in these scenarios.

In a first example scenario, a spreadsheet user has a series of names in an input column and wants to add the title "Mr." in front of each name. The user provided the input-output example shown in FIG. 7.

The challenge is to learn the desired transformation program from the given input-output example by deciding which substrings in the output string "Mr. Roger" are constant strings and which are substrings of the input string "Roger". In this case, it can be inferred that since the output substring $o_1[0.0]=M$ is not present in the input string, it has to be a constant string. But the output substring $o_1[1 \ldots 1]=r$ can come from two different substrings in the input string ($i_1[0 \ldots 0]=R$ and $i_1[4 \ldots 4]=r$). The ranking technique embodiments described herein learn all possible expressions to compute the substring "r" in the output string that includes (i) a position pair expression to extract the substring $i_1[0 \ldots 0]$ and perform lower case operation to produce "r" from "R", and (ii) a position pair expression to extract the substring $i_1[4 \ldots 4]$, and the constant string expression "r". The substrings of output string that do not exist in the input strings are guaranteed to be a constant string, whereas the substrings that do exist in the input strings can be either a constant string or substrings of the input string (although experience has shown they are more likely to be coming from the input string). For example, the output substring $o_1[4 \ldots 8]$=Roger is more likely to be coming from the input string $i_1$ than being a constant string "Roger". Using a similar argument, the substring $o_1[1 \ldots 1]$=r in the output string also exists in two places in the input string and is more likely to be coming from there. But in this example, "r" is required to be a constant string as the desired behavior of the program is to add the constant string "Mr." in front of each input string. To learn the desired transformation from one input-output example, the ranking technique embodiments described herein need to rank the constant string expression higher than the position pair expressions for the output substring "r". Some of the features that might help in ranking "r" as a constant string include:

a) Length of substring: Since the length of substring "r" is 1 it is unlikely to be an input substring;
b) Relative length of substring: The relative length of substring "r" as compared to the output string is also quite small, i.e., $\frac{1}{10}$; and
c) Constant neighboring characters: The neighboring characters "M" and "." of "r" are both constant expressions.

In a second example scenario, a spreadsheet user has series of addresses in a column and wants to extract the city names from them. The user provided the input-output example shown in FIG. 8.

In this case, the ranking technique embodiments described herein could learn more than 100 different SubStr expressions to extract the substring "Cambridge" from the input string "243 Flyer Drive, Cambridge, Mass. 02145", some of which are:

a) $p_1$: Extract the $3^{rd}$ alphabet token string;
b) $p_2$: Extract the $4^{th}$ alphanumeric token string;
c) $p_3$: Extract the substring between the $1^{st}$ and $2^{nd}$ token sequence consisting of comma and whitespace tokens; and
d) $p_4$: Extract the substring between the $3^{rd}$ capital token (inclusive) and the $2^{nd}$ comma token from the left.

The problem with learning position pair expressions $p_1$ and $p_2$ is that on the input string "512 Wright Ave, Los Angeles, Calif. 78911", it produces the output string "Los" that is not the desired output. In addition, position pair expression $p_4$ does not produce any output string from the input string "64 128th St, Seattle, Wash. 98102". On the other hand, the position pair expression $p_3$ generates the desired output string for each of the position pair expressions (i.e., Cambridge, Los Angeles, Seattle and San Francisco, respectively). As such, the ranking technique embodiments described herein would rank the position pair expression $p_3$ higher than the other position pair expressions to generate the desired output string from the one input-output example.

2.0 Exemplary Operating Environments

Figure 9:
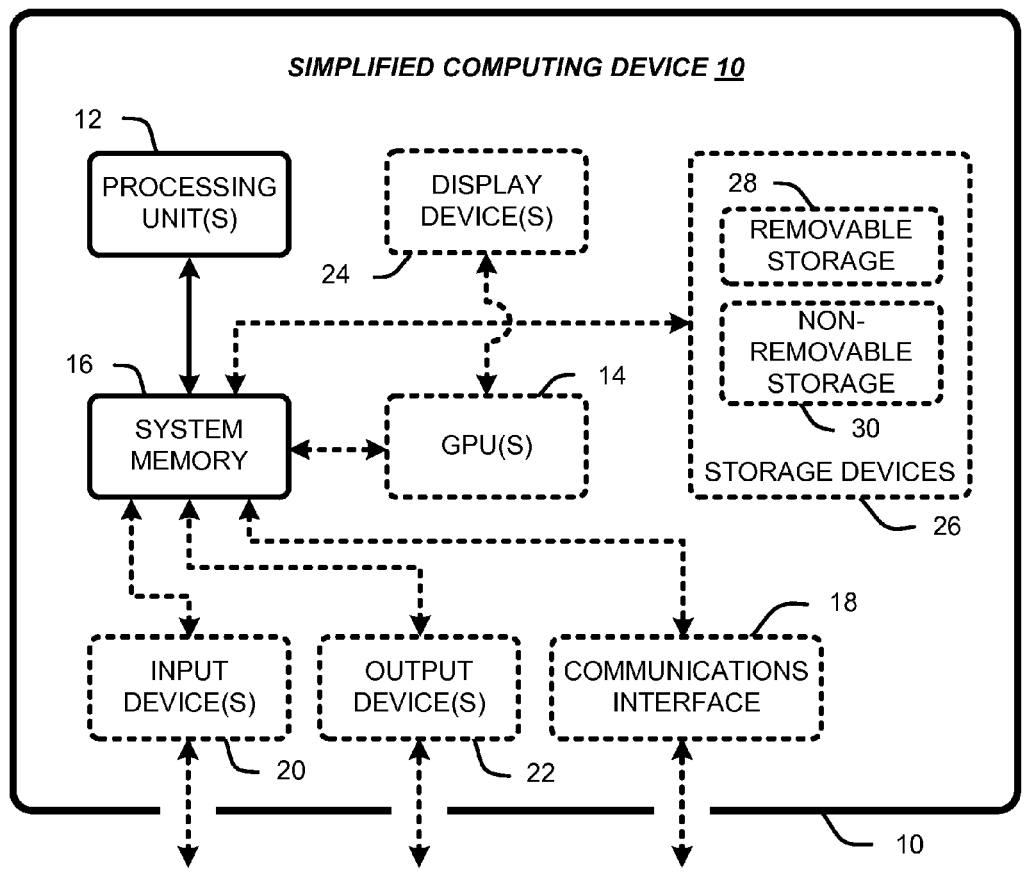
FIG. 9 is a diagram depicting a general purpose computing device constituting an exemplary system for implementing ranking technique embodiments described herein.

The ranking technique embodiments described herein are operational within numerous types of general purpose or special purpose computing system environments or configurations. FIG. 9 illustrates a simplified example of a general-purpose computer system on which various embodiments and elements of the ranking technique embodiments, as described herein, may be implemented. It should be noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement the ranking technique embodiments described herein, the device should have a sufficient computational capability and system memory to enable basic computational operations. In particular, as illustrated by FIG. 9, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 9 may also include other components, such as, for example, a communications interface 18. The simplified computing device of FIG. 9 may also include one or more conventional computer input devices 20 (e.g., pointing devices, keyboards, audio input devices, video input devices, haptic input devices, devices for receiving wired or wireless data transmissions, etc.). The simplified computing device of FIG. 9 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 9 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. Computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various ranking technique embodiments described herein, or portions thereof, may be stored, received, transmitted, or read from any desired combination of computer or machine readable media or storage devices and communication media in the form of computer executable instructions or other data structures.

Finally, the ranking technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for ranking candidate transformation programs, each comprising program expressions comprising sub-expressions, to establish a ranked group of one or more transformation programs each of which produces an output string in a user-desired form from input strings entered by a user, consistent with each of one or more user-supplied input-output examples, comprising:
using a computer to perform the following process actions:
inputting the set of candidate transformation programs, which were inductively synthesized from the one or more user-supplied input-output examples, each of which produces an output string in a form exhibited by each user-supplied output example from each user-supplied input example;
for each candidate transformation program,
for each sub-expression of the candidate transformation program, in an order from smaller to larger, for which a ranking scheme has been established, establishing a likelihood score using the ranking scheme established for that sub-expression, and
computing an overall ranking score for the candidate transformation program from the sub-expression likelihood scores established for that candidate transformation program.

2. The process of claim 1, wherein a sub-expression is either a regular expression or a position expression or an atomic expression or a concatenate expression, and wherein said ranking schemes are established for ranking each of said regular expressions, position expressions, atomic expressions, and concatenate expressions, in that order.

3. The process of claim 2, wherein an atomic expression is either a constant string expression or a substring expression, and wherein the process action of establishing ranking schemes for atomic expressions, comprises the actions of:
identifying whether the atomic expression is a constant string expression or a substring expression;
inputting a training set of tasks, where each task consists of multiple input-output examples;
generating training data from the training set; and
training a machine learning classifier to assign a likelihood score to each substring expression and each constant string expression.

4. The process of claim 3, wherein the process action of assigning a likelihood score to each substring expression comprises assigning a likelihood score having a value in a range from 0 to 1, and wherein the process action of assigning a likelihood score to each constant string expression comprises assigning a prescribed likelihood score value.

5. The process of claim 3, wherein the process action of generating training data from the training set of tasks, comprises the actions of:
for each task in the training set,
for each input-output example in the task,
establishing a set of transformation programs inductively synthesized from the input-output example, each of which produces the output string in the example from a tuple of input strings in the example,
establishing a set of positive training sub-expressions from the set of transformation programs,
establishing a set of negative training sub-expressions from the set of transformation programs, and
generating the training data from each substring expression in the sets of positive and negative training sub-expressions.

6. The process of claim 5, wherein the process action of generating training data from each substring expression in the sets of positive and negative training sub-expressions, comprises the actions of:
inputting a set of one or more features, each of said features being indicative of whether a substring in the output string is produced by a substring expression in the sets of positive and negative training sub-expressions;
for each substring expression in the sets of positive and negative training sub-expressions, generating a feature vector comprising a prescribed order of elements wherein each element, except one reserved to a class label, corresponds to a feature value respectively associated with one of said features, said feature vector generation comprising,
for each of said features in an order corresponding to the prescribed order of elements, assigning a feature value having a first binary value if the feature is exhibited in a substring in the output string produced by the substring expression under consideration to the corresponding feature vector element, and assigning a feature value having a second binary value if the feature is not exhibited in a substring in the output string produced by the substring expression under consideration to the corresponding feature vector element, and for the feature vector element reserved for said class label, assigning one binary value if the substring expression is in the set of positive training sub-expressions, and assigning a different binary value if the substring expression is in the set of negative training sub-expressions.

7. The process of claim 6, wherein said set of one or more features, comprises at least one of:
- a left position of the output substring being recognized by a token; or
- a character at the left position of the output substring is a constant; or
- a right position of the output substring being recognized by a token; or
- a character at the right position of the output substring is a constant; or
- an output substring denotes a token; or
- a left position of the input substring being recognized by a token; or
- a right position of the input substring being recognized by a token; or
- an input substring is a token; or
- a casing performed to obtain the output substring; or
- a length of the substring; or
- a relative length of the substring to the length of the input string; or
- a relative length of the substring to the length of the output string; or
- likelihood scores of the constituent position expressions.

8. The process of claim 6, wherein the machine learning classifier is a support vector machine (SVM) binary-classifier.

9. The process of claim 5, wherein the process action of establishing a set of positive training sub-expressions from the set of transformation programs established from an input-output example in a task comprises designating each sub-expression found in the intersection of all sets of transformation programs synthesized from the input-output examples in said task as a positive training sub-expression.

10. The process of claim 9, wherein the process action of establishing a set of negative training sub-expressions from the set of transformation programs established from the input-output example in the task comprises designating each sub-expression in the set of transformation programs that is not identified as positive training sub-expression as a negative training sub-expression.

11. The process of claim 5, wherein the process action of establishing ranking schemes for regular expressions and position expressions, comprises an action of computing a dictionary that maps sub-expressions that generate an output substring that takes values from a set having a finite number of pre-defined tokens to a frequency-based score based on their frequencies in the sets of positive training sub-expressions.

12. The process of claim 2, wherein the process action of establishing ranking schemes for concatenate expressions comprises combining scores for individual atomic expressions found in a concatenate expression.

13. The process of claim 12, wherein the process action of combining scores for individual atomic expressions found in a concatenate expression, comprises one of multiplying the scores, or adding the scores.

14. The process of claim 1, further comprising a process action of selecting a prescribed number of the top ranking candidate transformation programs as said ranked group of one or more transformation programs.

15. The process of claim 14, wherein the process action of selecting a prescribed number of the top ranking candidate transformation programs as said ranked group of one or more transformation programs, comprises selecting the highest-ranking candidate transformation program.

16. A computer-implemented process for performing string transformations, comprising:
using a computer to perform the following process actions:
inputting a set of candidate transformation programs, each comprising program expressions comprising sub-expressions, which were inductively synthesized from one or more user-supplied input-output examples, and each of which produces an output string in a form exhibited by each user-supplied output example from each user-supplied input example;
ranking the set of candidate transformation programs to identify a highest-ranked transformation program; and
applying the highest-ranked transformation program to a user-supplied input string to produce an output string.

17. A system for ranking candidate transformation programs, each program comprising program expressions comprising sub-expressions, to establish a ranked group of one or more transformation programs each of which produces an output string in a user-desired form from input strings entered by a user, consistent with each of one or more user-supplied input-output examples, comprising:
one or more computing devices, wherein said computing devices are in communication with each other via a computer network whenever there are multiple computing devices; and
a computer program having program modules executed by the one or more computing devices, the one or more computing devices being directed by the program modules of the computer program to,
input the set of candidate transformation programs, which were inductively synthesized from the one or more user-supplied input-output examples, each of which produces an output string in a form exhibited by each user-supplied output example from each user-supplied input example; and
for each candidate transformation program,
for each sub-expression of the candidate transformation program, in an order from smaller to larger, for which a ranking scheme has been established, establish a likelihood score using the ranking scheme established for that sub-expression, and
compute an overall ranking score for the candidate transformation program from the sub-expression likelihood scores established for that candidate transformation program.

18. The system of claim 17, further comprising a program module for establishing said ranking schemes prior to ranking candidate transformation programs, each ranking scheme producing a likelihood score indicative of the likelihood that the sub-expression is part of a program capable of producing an output string in the user-desired form from input strings entered by a user, consistent with each of the one or more user-supplied input-output examples, said ranking scheme establishment program module comprising a sub-module for establishing said ranking schemes for ranking each of regular expressions, position expressions, atomic expressions, and concatenate expressions, in that order, wherein a sub-expression is either a regular expression or a position expression or an atomic expression or a concatenate expression.

19. The system of claim 18, wherein the program module for, for each sub-expression of the candidate transformation program for which a ranking scheme has been established, establishing a likelihood score using the ranking scheme established for that sub-expression, comprises sub-modules for:

using frequency-based ranking for regular expressions and position expressions, said frequency-based ranking comprising employing a dictionary that maps regular expressions and position expressions to a frequency-based score;

using feature-based ranking for atomic expressions, wherein an atomic expression is either a constant string expression or a substring expression, and wherein said feature-based ranking comprises, identifying whether the atomic expression is a constant string expression or a substring expression, whenever the atomic expression is a constant string expression, assigning a prescribed likelihood score value, whenever the atomic expression is a substring expression, assigning a likelihood score value using a machine learning classifier that has been trained to assign a likelihood score to each substring expression; and using path-based ranking for concatenate expressions, said path-based ranking comprising combining scores for individual atomic expressions found in a concatenate expression.

20. The system of claim 17, further comprising a program module for selecting a prescribed number of the top ranking candidate transformation programs as said ranked group of one or more transformation programs.

* * * * *